(12) United States Patent
Boyd et al.

(10) Patent No.: US 7,047,379 B2
(45) Date of Patent: May 16, 2006

(54) AUTONOMIC LINK OPTIMIZATION THROUGH ELIMINATION OF UNNECESSARY TRANSFERS

(75) Inventors: Kenneth Wayne Boyd, Tucson, AZ (US); Kenneth Fairclough Day, III, Tucson, AZ (US); Philip Matthew Dudas, Tucson, AZ (US); William Frank Micka, Tucson, AZ (US); John Jay Wolfgang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 10/618,242

(22) Filed: Jul. 11, 2003

(65) Prior Publication Data

US 2005/0010732 A1      Jan. 13, 2005

(51) Int. Cl.
*G06F 12/00* (2006.01)

(52) U.S. Cl. .................. 711/162; 711/203; 707/204
(58) Field of Classification Search ........ 711/161–162, 711/1, 117, 144; 707/8, 200–206; 714/15, 714/805
See application file for complete search history.

(56) References Cited

U.S. PATENT DOCUMENTS

| | | | |
|---|---|---|---|
| 4,761,785 A | 8/1988 | Clark et al. | 714/805 |
| 5,276,835 A | 1/1994 | Mohan et al. | 711/144 |
| 5,278,982 A | 1/1994 | Daniels et al. | 707/202 |
| 5,317,731 A | 5/1994 | Dias et al. | 707/8 |
| 5,327,556 A | 7/1994 | Mohan et al. | 707/8 |
| 5,440,727 A | 8/1995 | Bhide et al. | 711/117 |
| 5,455,944 A | 10/1995 | Haderle et al. | 707/202 |
| 5,465,328 A | 11/1995 | Dievendorff et al. | 714/15 |
| 5,557,770 A | 9/1996 | Bhide et al. | 711/161 |
| 5,793,412 A * | 8/1998 | Asamizuya | 725/115 |
| 5,974,425 A | 10/1999 | Obermarck et al. | 707/202 |

(Continued)

FOREIGN PATENT DOCUMENTS

JP    WO 92/12482    7/1992

OTHER PUBLICATIONS

U.S. Appl. No. 10/339,957, filed Jan. 9, 2003, K. W. Day et al.

(Continued)

*Primary Examiner*—Nasser Moazzami
(74) *Attorney, Agent, or Firm*—John H. Holcombe

(57) ABSTRACT

Disclosed are a system, a method, and a computer program product to efficiently create consistent transaction sets to maintain one or more copies of data at different data storage sites. All transactions sent to a primary backup appliance during a consistent transaction set creation interval are formed into a consistent transaction set by efficiently adding new transactions as they are received and removing unnecessary transfers as newer versions arrive. When the creation interval has expired, the complete consistent transaction set is transferred to a secondary backup appliance to be used to update a consistent backup copy of the primary site data. For each consistent transaction set, there will be a tree data structure (a search tree) created that contains the addressing information for all of the blocks of data in the consistent transaction set. The tree data structure used is a modified splay tree, which is a specialization of a binary search tree such that accessed nodes are "percolated" to the top of the tree for faster subsequent access. Secondary data consistency is maintained because the consistent transaction sets are applied whole at the secondary site, and after application, the secondary volumes are exact copies of the primary volumes at the time the consistent transaction set was completed.

18 Claims, 7 Drawing Sheets

U.S. PATENT DOCUMENTS

| | | | |
|---|---|---|---|
| 6,105,103 A | 8/2000 | Courtright, II et al. | 711/1 |
| 6,289,355 B1 | 9/2001 | Haderle et al. | 707/200 |
| 6,363,462 B1 | 3/2002 | Bergsten | 711/162 |
| 6,564,219 B1* | 5/2003 | Lee et al. | 707/100 |
| 6,651,074 B1* | 11/2003 | Taylor | 707/204 |
| 2002/0087672 A1 | 7/2002 | Milligan et al. | 709/223 |

OTHER PUBLICATIONS

IEEE, vol. 13, No. 5, May 2002; pp. 499-515.

IBM TDB, vol. 24, No. 2, Jul., 1981, pp. 986-987.

Menon, J et al., IBM RJ 8230 (75424); Jul. 1991; pp. 302-309.

RD; Mar. 2001; No. 443; pp. 464-465.

ACM, "Trans. On Comp. Syst."; vol. 10, No. 1; Feb. 1992; pp. 26-52.

ACM, P-A Larson, et al., "Memory Management During . . . ", 1998, pp. 472-483.

IEEE, A. Thomasian, "Priority Queueing in RAID5 Disk Arrays . . . ", Oct. 1994, pp. 168-172.

IBM RJ 9187; Menon, J. et al. "The Architecture of a Fault-Tolerant . . . ", Jan. 1993, pp. 76-86.

* cited by examiner

AUTONOMIC LINK OPTIMIZATION THROUGH ELIMINATION OF UNNECESSARY TRANSFERS

CROSS-REFERENCES TO RELATED APPLICATIONS

The present application is related to application Ser. No. 10/618,400, entitled "Autonomic Predictive Load Balancing of Output Transfers for Two Peer Computers for Data Storage Applications", and to application Ser. No. 10/617,932, entitled "Autonomic Learning Method To Load Balance Output Transfers of Two Peer Nodes", both filed on an even date herewith, the disclosures of which are hereby incorporated by reference in their entirety.

TECHNICAL FIELD

This invention concerns a system to organize and maintain multiple copies of groups of data across multiple data storage locations.

BACKGROUND OF THE INVENTION

Data storage systems may maintain more than one copy of data to protect against losing the data in the event of a failure of any of the data storage components. A secondary copy of data is maintained at a remote site in the event of a failure at the primary site. Secondary copies of the current data contained in the primary site are typically made as the application system is writing new data to a primary site. In some data storage systems the primary site may include a backup appliance to store the data in one or more storage devices located at the primary site and to organize and transfer the data to the secondary site. The secondary site receives inbound data from the backup appliance and transfers the data to a storage controller, storage device(s), or other computers for backup storage of the data. This type of system could be used for a disaster recovery solution where a primary storage controller sends data to a backup appliance that, in turn, offloads the transfers to a secondary storage controller at a remote site. In such backup systems, data is typically maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary storage and a secondary storage controller may be provided to control access to the secondary storage. The backup appliance also maintains consistent transaction sets between the two sites, wherein application of all the transactions to the secondary site creates a point-in-time consistency between the primary and secondary sites. The backup appliance will receive and maintain consistent transaction sets before offloading the consistent transaction sets to the secondary device. Some data storage systems avoid consistency problem by applying all data updates to the secondary site in the same order they were received from the primary. This may result in sending multiple updates to the secondary site when only one update may be necessary. Alternatively, a point in time version of the consistent transaction data may be collected by the backup appliance and then transferred to the secondary site to provide a complete consistent transaction set at the secondary site. Organizing and transferring the point in time version of the consistent transaction data sets to the secondary site in an efficient manner is needed.

SUMMARY OF THE INVENTION

It is an object of the present invention to provide a system, method, and computer program product to efficiently create consistent transaction sets. All transactions sent to a primary backup appliance during a consistent transaction set creation interval are formed into a consistent transaction set by efficiently adding new transactions as they are received and removing unnecessary transfers as newer versions arrive. When the creation interval has expired, the complete consistent transaction set is transferred to a secondary backup appliance to be used to update a consistent backup copy of the primary site data. The secondary backup appliance may maintain a number of consistent transaction sets to enable restoring the secondary copy to its state at specific points in time.

The primary backup appliance creates the consistent transaction set in memory while transactions are received during the consistent transaction set creation interval. The backup appliance typically receives data transfers for specific volumes from a primary storage controller in a proprietary format. The backup appliance converts the data transfers to a format compatible for an open-system storage device(s). The open-system storage device(s) format includes addressing information in the form of a world-wide name, logical unit number (WWN/LUN) and logical block address (LBA). The WWN/LUN specifies the address of the storage device and the LBA specifies the address within the storage device to store a block of data at the primary site. For each consistent transaction set, there will be a tree data structure (a search tree) created that contains the addressing information for all of the blocks of data in the consistent transaction set. The tree data structure containing the addressing information is maintained by the backup appliance at the primary site. The primary backup appliance creates complete consistent transaction sets before transferring the consistent transaction sets to the secondary backup appliance. During each consistent transaction set creation interval, multiples copies of the same data block (having the same address: WWN/LUN and LBA) may be received from the primary site. Only the latest version of this data block needs to be written to the backup volume. The present invention applies all of the updates that occur during the creation interval before transferring the consistent transaction set to the secondary storage site. Secondary data consistency is maintained because the consistent transaction sets are applied whole at the secondary site, and after application, the secondary volumes are exact copies of the primary volumes at the time the consistent transaction set was completed.

Addressing information specifying a storage device address and storage address within the storage device is determined for a transaction received by the backup appliance at the primary site. A tree data structure to organize the data is constructed and maintained as the data is received. The tree data structure contains the addressing information for the storage of the data. The tree data structure used is a modified splay tree, which is a specialization of a binary search tree such that accessed nodes are "percolated" to the top of the tree for faster subsequent access. The modified splay tree used in the present invention requires that accessed nodes may only be moved to the top of the tree when the depth of the accessed node is greater than a specified threshold value. This modification prevents thrashing in the tree (moving nodes around excessively), while providing fast access to the nodes that are expected to be accessed frequently. Each node in the tree contains the addressing information for all of the data blocks for a particular WWN/LUN. Incoming data addressing information is inserted into the tree underneath the appropriate WWN/LUN node. If no WWN/LUN node exists in the tree for a received block of data then a node is created for the received block of data. If the depth of the WWN/LUN node (which is calculated while searching for the node) for the received data is greater than the specified threshold value, the node is moved to the top of the tree using normal splay tree rotations. If the particular data block received is already in the tree, an overwrite of the memory that contains that block is executed. When the consistent transaction set creation interval ends, the tree data structure contains all the addressing information for the data in the set and redundant overwritten data blocks are eliminated. The complete tree data structure and the data are then transferred to the secondary site to update the secondary storage.

For a more complete understanding of the present invention, reference should be made to the following detailed description taken in conjunction with the accompanying drawings.

DETAILED DESCRIPTION OF THE PREFERRED EMBODIMENTS

This invention is described in preferred embodiments in the following description. The preferred embodiments are described with reference to the Figures. While this invention is described in conjunction with the preferred embodiments, it will be appreciated by those skilled in the art that it is intended to cover alternatives, modifications, and equivalents as may be included within the spirit and scope of the invention as defined by the appended claims.

Figure 1:
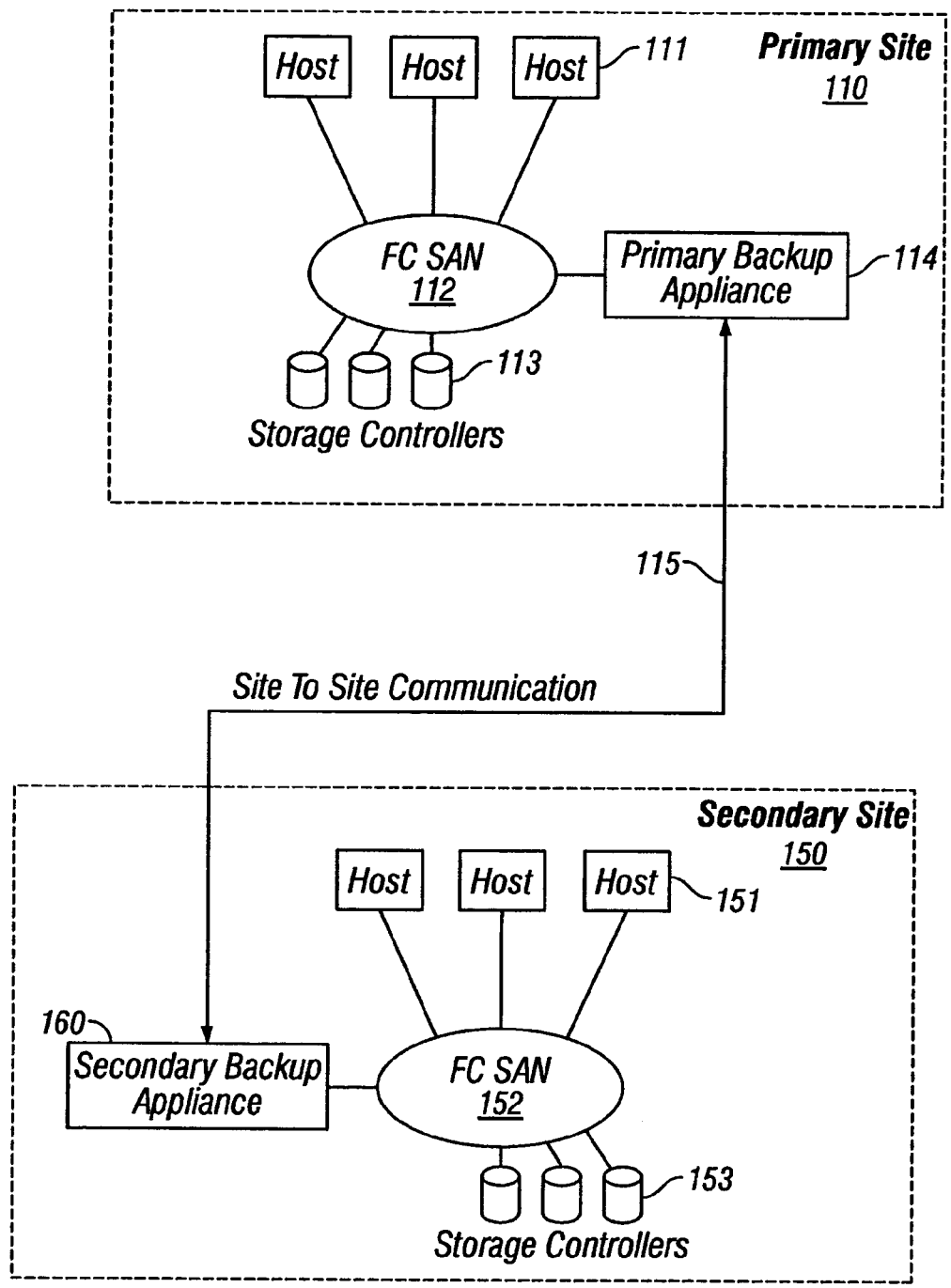
FIG. 1 is a block diagrammatic representation of a data storage system with primary and secondary data storage sites.

Data storage systems may maintain more than one copy of data at secondary data storage sites to protect against losing the data in the event of a failure of any of the data storage components at the primary site. FIG. 1 shows a block diagram of a data storage system with a primary site 110 and secondary site 150. Primary site 110 and secondary site 150 are data storage sites that may be separated by a physical distance or the sites may be located in close proximity to each other. Both the primary site 110 and secondary site 150 have one or more host computers 111, 151, a communication network within each site 112, 152, storage controllers 113, 153, and a communication network 115, between the sites. The host computers 111, 151, store and retrieve data with respect to the storage controllers 113, 153, using the site communication network 112, 152. The site communication network(s) 112, 152 may be implemented using a fiber channel storage area network (FC SAN). Data is transferred between the primary site 110 and secondary site 150 using communication network 115 through primary backup appliance 114 and secondary backup appliance 160. A secondary copy of the data from the primary site 110 is transferred to and maintained at the secondary site 150. In the event of a failure at the primary site 110 processing may be continued at secondary site 150. Because the physical distance may be relatively large between the primary site 110 and secondary site 150, the communication network 115 is typically slower than the communication network within each site 112, 152. Because of the relatively slow communication network 115 between the sites, consistent transaction sets are sent from primary site 110 to the secondary site 150 to ensure a point in time consistency between the sites. Consistent transaction sets are described in application entitled "Method, System and Article of Manufacture for Creating a Consistent Copy", Application # 10339957, filed on Jan. 9, 2003 of which is hereby incorporated by reference in its entirety. At the secondary site 150 the consistent transaction set is received and then transferred to various data storage devices for permanent storage.

Figure 2:
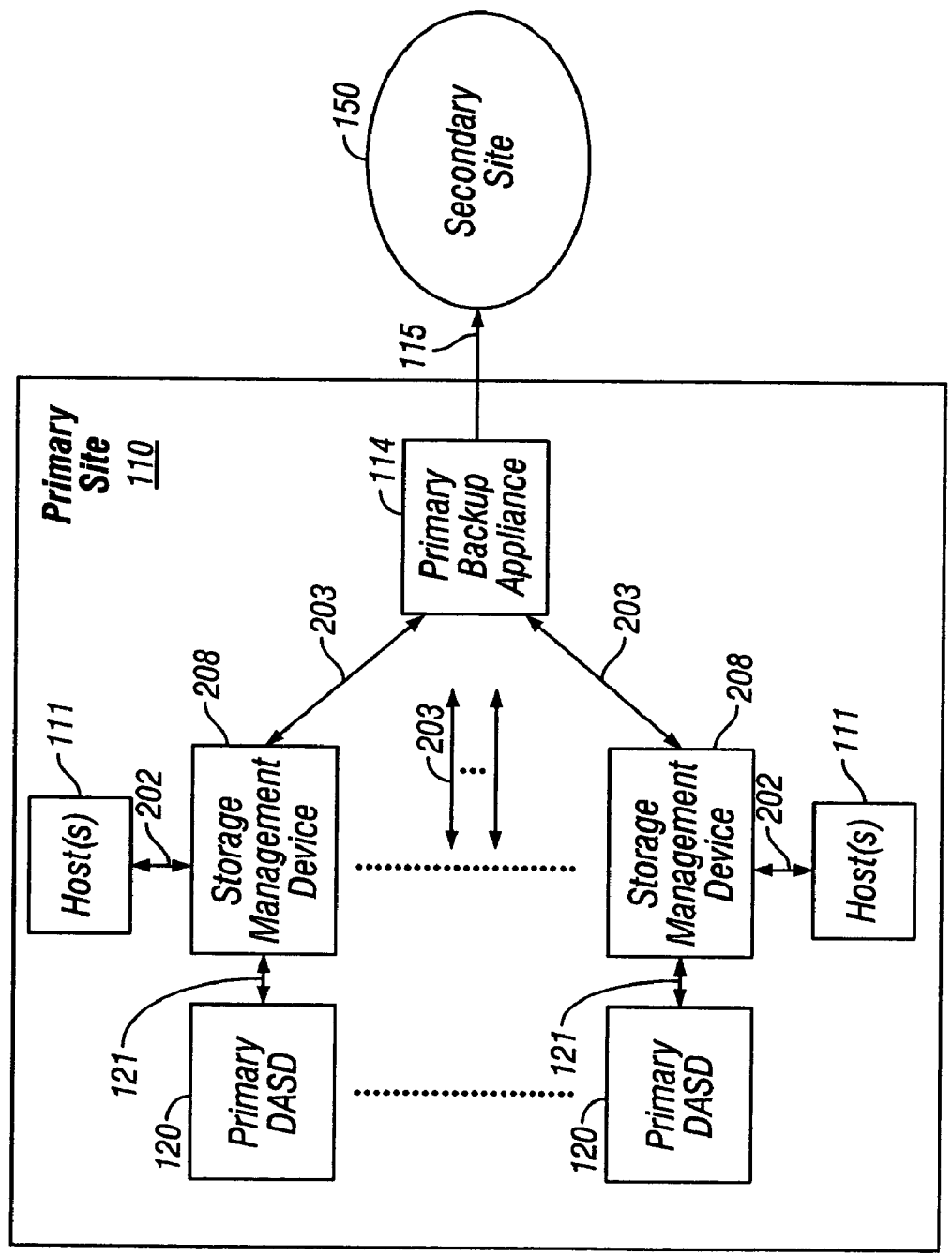
FIG. 2 is a block diagrammatic representation of a portion of the components located at the primary storage site.

FIG. 2. is a block diagrammatic representation of a portion of the components located at the primary site 110. Host computer(s) 111 communicates with storage management device(s) 208 using communication line(s) 202. Storage management device(s) 208 may comprise any storage management system known in the art, such as a storage controller, server, enterprise storage server, etc. The storage management device(s) 208 communicates with backup appliance 114 using communication line(s) 203. Primary DASD(s) 120 communicates with storage management device(s) 208 using communication line(s) 121. Primary DASD(s) 120 provides temporary data storage. Communication lines 202, 203 and 121 may be implemented using any network or connection technology known in the art, such as a Local Area Network (LAN), Wide Area Network (WAN), Storage Area Network (SAN), the Internet, an Intranet, etc. Communication between any of the components shown in FIG. 2 may be in the form of executable instructions, requests for action, data transfers, status, etc. Primary site 110 may contain additional components than shown in FIG. 2. A plurality of storage management devices 208 and primary DASD(s) 208 may interface to the primary backup appliance 114 using a plurality of communication lines 203. Primary backup appliance 114 transfers data to the secondary site 150 using communication network 115.

Figure 3:
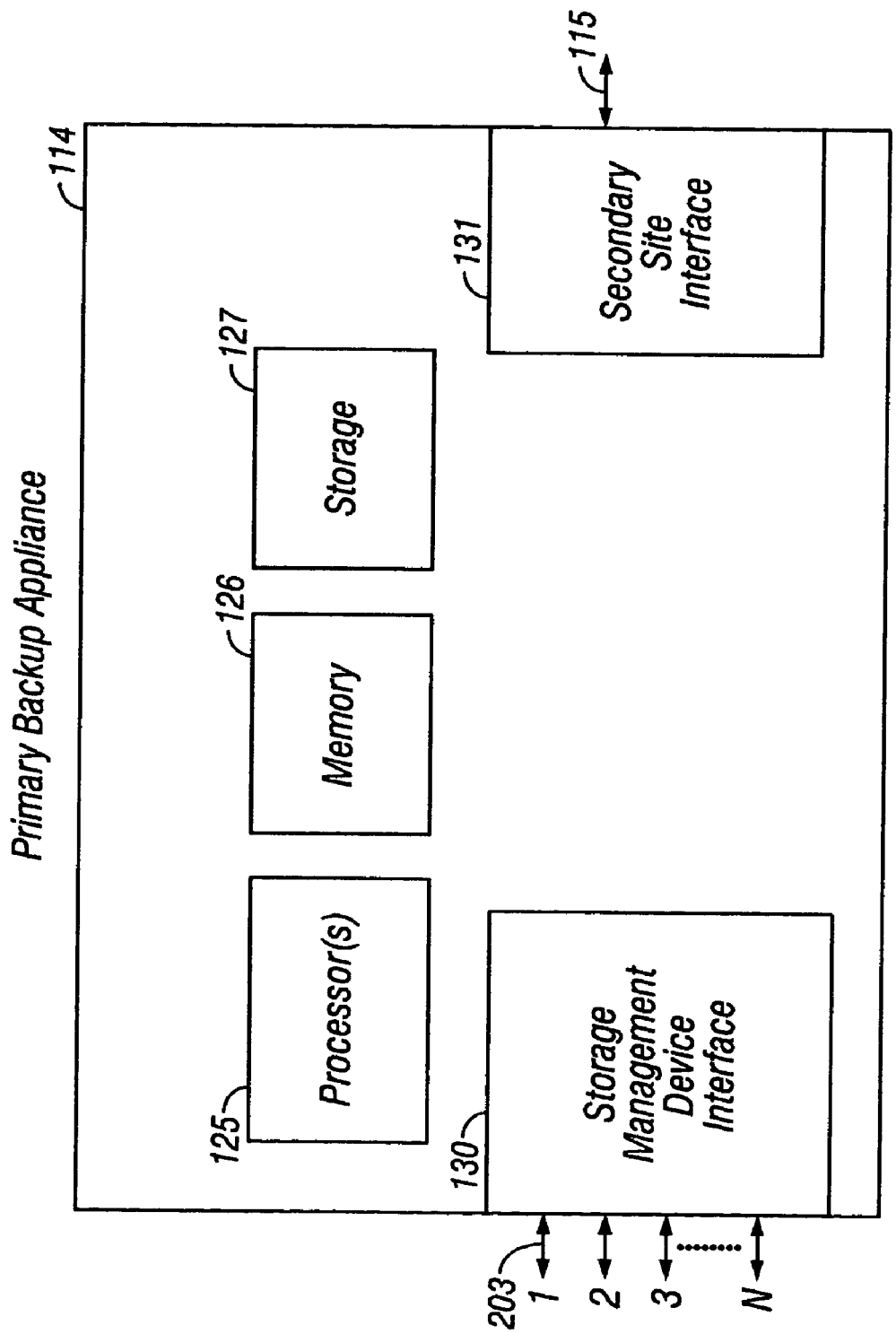
FIG. 3 is a block diagrammatic representation of a portion of the components located in the primary backup appliance.

FIG. 3. is a block diagrammatic representation of a primary backup appliance 114 located at the primary site 110. Primary backup appliance 114 may be implemented by a combination of one or more computers operating together. Primary backup appliance 114 includes one or more processors 125, memory 126, storage 127, storage management device interface 130, and secondary site interface 131. Processor(s) 125 may comprise an off the shelf microprocessor, custom processor, FPGA (Field Programmable Gate Array), ASIC (Application Specific Integrated Circuit), discrete logic, etc. Memory 126 may comprise random access memory (RAM) and/or nonvolatile memory and is typically used to hold variable data, stack data, executable instructions, etc. The nonvolatile memory may comprise any type of nonvolatile memory such as EEPROM (Electrically Erasable Programmable Read Only Memory), flash PROM (Programmable Read Only Memory), battery backup RAM, hard disk drive, etc. The nonvolatile memory is typically used to hold the executable firmware and any nonvolatile data. Storage 127 is used to store data and may comprise DASD devices, optical storage devices, or other mass storage devices known in the art. Secondary site interface 131 communicates between the primary backup appliance 114 and the secondary site 150 using communication line(s) 115. Storage management device interface 130, communicates between the primary backup appliance 114 and the one or more storage management devices 208 using communication line(s) 203. Storage management device interface 130 may be generalized to include interfacing to other devices that supply data to primary backup appliance 114. For example, storage management device interface 130 may be used in an ESCON environment to connect to a hardware port on a host bus adapter. Communication line(s) 203 may also be generalized to include the ESCON, FC-SCSI, or other interfaces known in the art. One or more of communication line(s) 203 may be in use during the operation of the present invention.

Figure 4A:
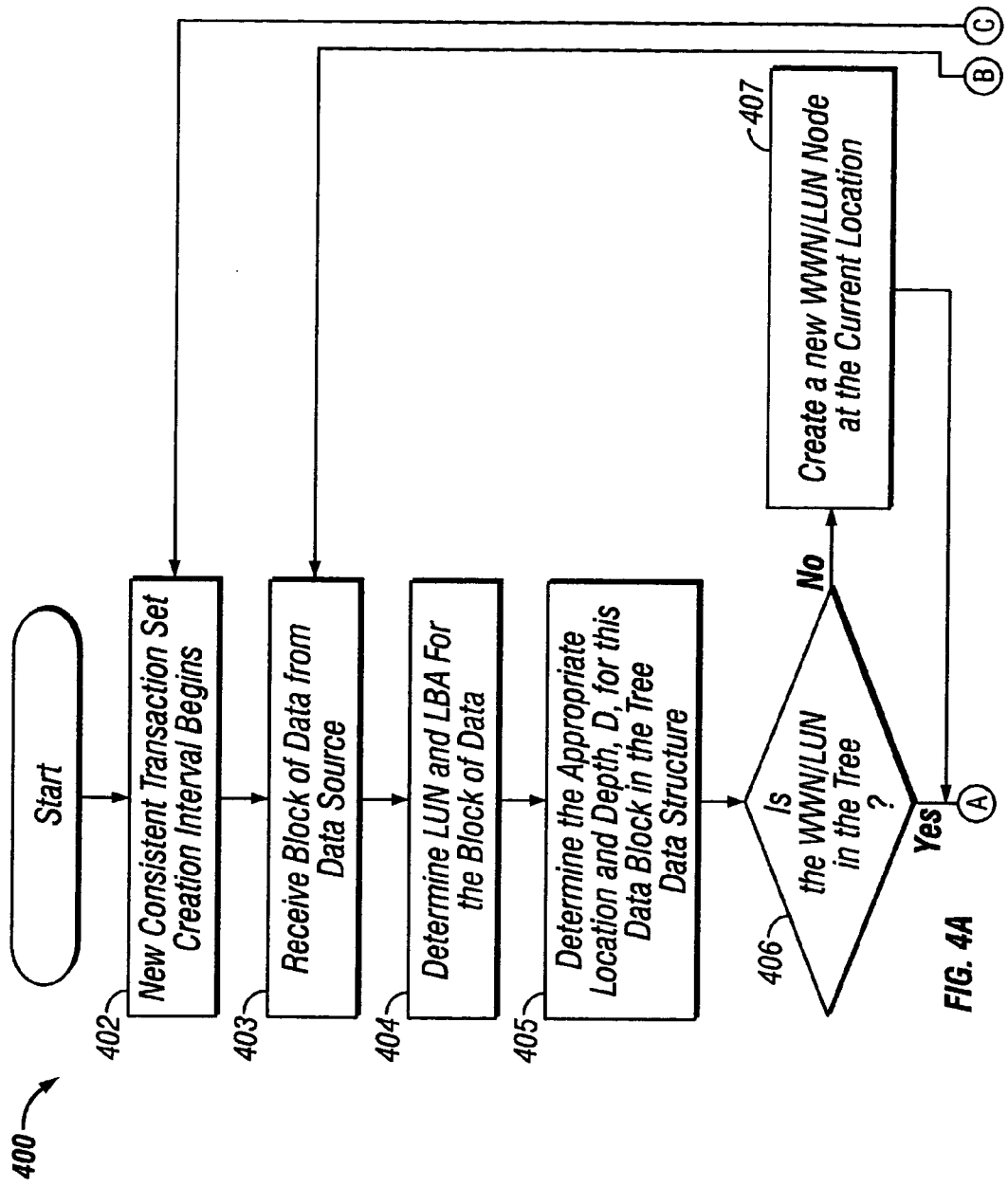
FIG. 4 is a flowchart of a method to organize and store a group of data.
Figure 4B:
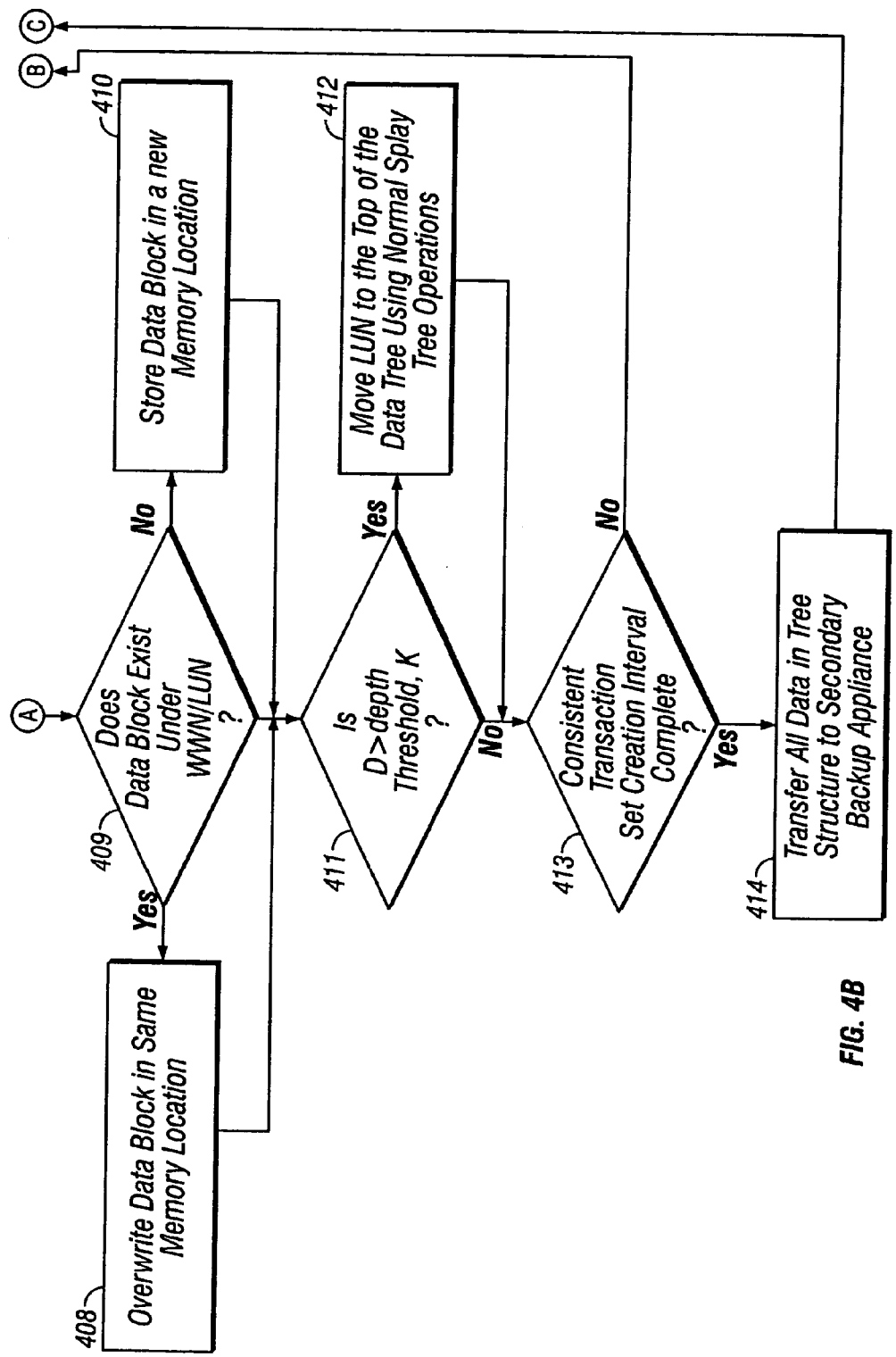

FIG. 4 contains flowchart 400 detailing the operation of the system to implement the present invention for organizing and transferring consistent transaction sets from a primary data storage site to one or more secondary data storage sites. At step 402, a new consistent transaction set creation interval begins resulting in primary backup appliance 114 receiving transactions from a data source. The data source may be one or more storage management devices 208, primary DASD(s) 120, host computer(s) 111 or other components located at the primary site 110 or associated with the primary site 110. At step 403 a block of data from the consistent transaction set is received by primary backup appliance 114 though storage management device interface 130, using communication line(s) 203. The consistent transaction set is comprised of one or more blocks of data. At step 404, primary backup appliance 114 determines the logical unit number (LUN) and logical block address (LBA) for the block of data received. Each storage device used for the storage of data has an address specified as the combination of a Worldwide Name and a Logical Unit Number (WWN/LUN). LUN is used as a shorthand notation for WWN/LUN in this description to identify a storage device address. Herein the terms LUN and storage device address are used interchangeably to identify a storage device address. The storage device may be comprised of DASD devices, optical storage devices, magnetic tape storage devices or other mass storage devices known in the art. The present invention is not limited to the use of a LUN to identify a storage device or storage device address and any terminology known in the art may be used. LBA identifies the address within the LUN where the data block will be stored. The LUN and LBA may be received with each block of data received by primary backup appliance 114 or they may be transmitted and maintained separately. Primary backup appliance 114 determines the LUN and LBA by extracting the information from the block of data received or from information associated with the block of data received. This invention is not limited to the use of LUN and LBA to identify a storage device address and/or storage location or to limit the use of this invention to any specific format to organize, store and maintain the data. Other means to identify a storage device and/or storage location may be used with the present invention without any disadvantage.

Figure 5:
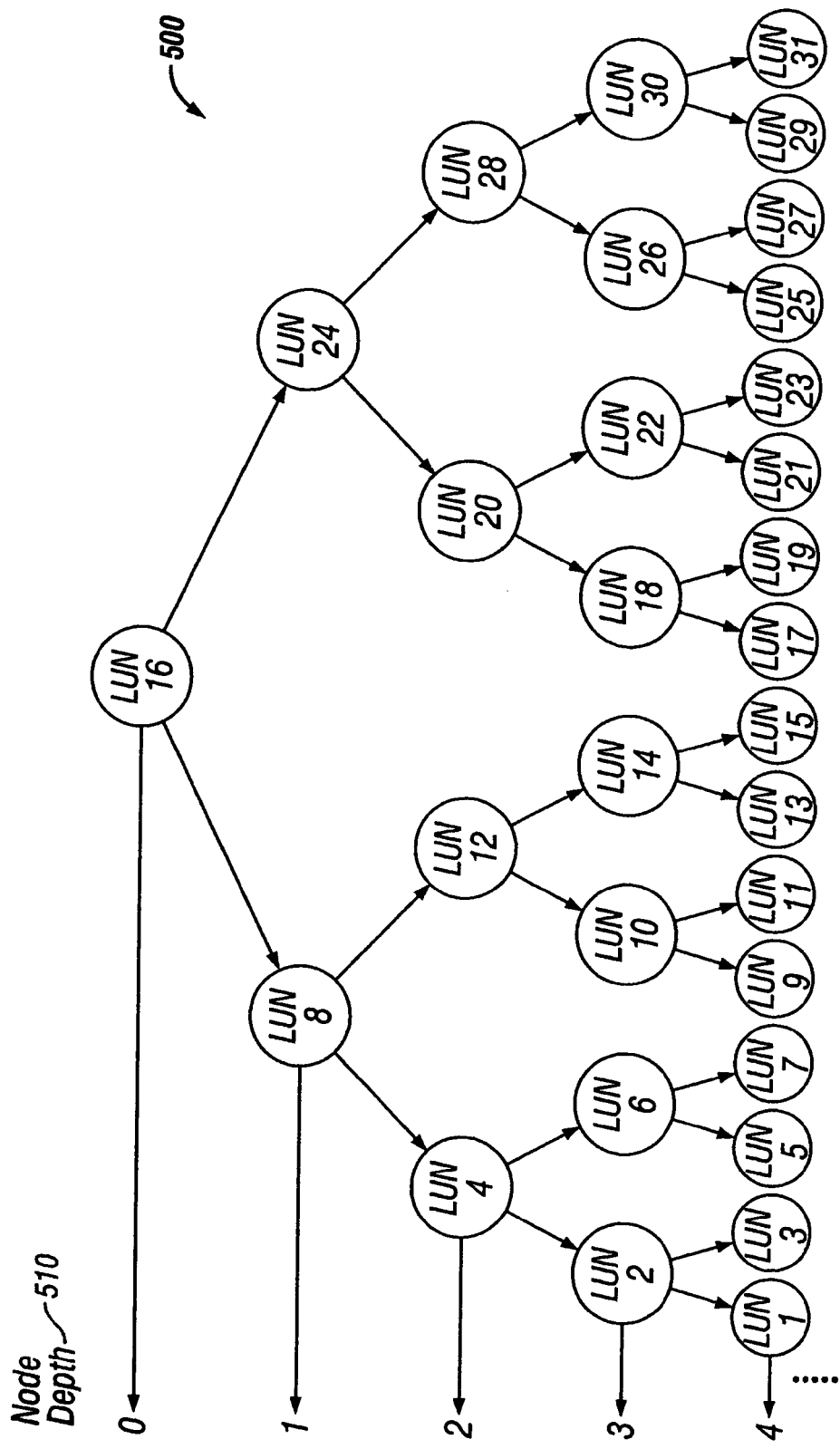
FIG. 5 is a drawing of a portion of tree data structure used to organize a group of data.
Figure 6:
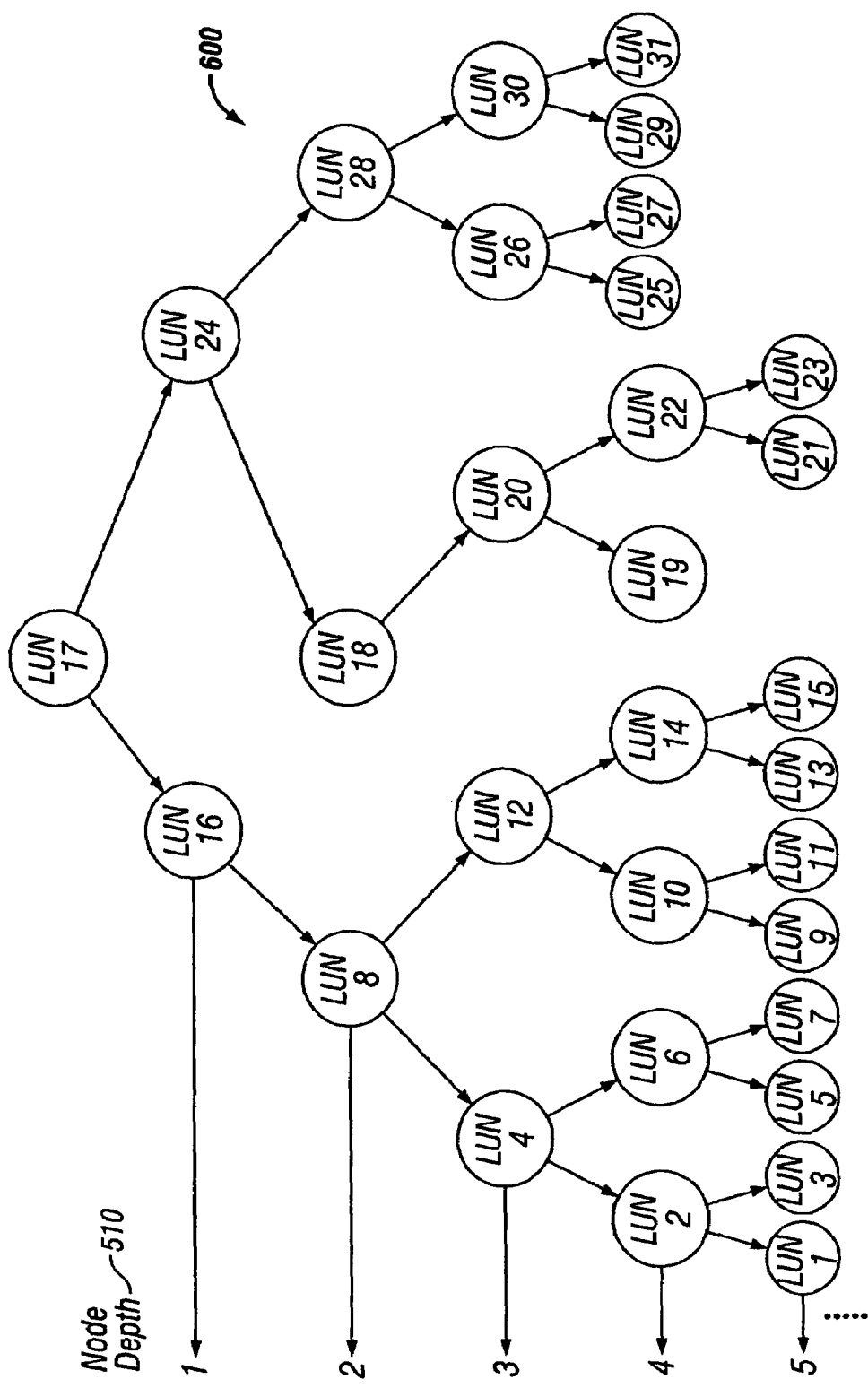
FIG. 6 is a drawing of a portion of tree data structure used to organize a group of data showing the change in the tree data structure after a storage device node is advanced to the top of the tree data structure.

At step 405, the process of maintaining addressing information in the tree data structure for the current consistent transaction set begins. Primary backup appliance 114 uses the LUN/LBA to determine where in the tree data structure the received block of data should be stored. FIG. 5 contains a diagram of an example of a tree data structure 500 that may exist for a consistent transaction set. Each node on the tree is represented by a circle and is labeled with a LUN number. In this example the top of the tree contains LUN 16. Under LUN 16 are the next closest nodes labeled LUN 8 and LUN 24. At the left side of FIG. 5 is a numerical listing of the node depth 510. Node depth 510 begins at 0 for the top of the tree and increases by 1 for each node level below the top as shown in FIG. 5. Nodes labeled LUN 8 and LUN 24 have a node depth 510 of 1, Nodes LUN 4, LUN 12, LUN 20 and LUN 28 have a node depth 510 of 2, etc. The example shown in FIG. 5 continues to node depth 510, D, represented by the dotted horizontal line. For larger tree data structures D will be larger. At each LUN in the tree one or more LBAs may exist. For each block of data received by the primary backup appliance 114 the tree data structure may be modified to include the LUN and LBA for the block of data in the tree structure (explained below). FIG. 6 shows and example of a modification of the tree data structure of FIG. 5 when LUN 17 with a node depth 510 of 4 is moved to the top of the tree. Nodes may be moved to the top of the tree as a result of the operation of the present invention (see below). After the modification, a portion of the LUNs have changed locations resulting in LUN 17 having a node depth 510 of 0, LUN 1 having a node depth 510 of 1, LUN 2 having a node depth 510 of 2, LUN 4 having a node depth 510 of 3 and LUN 8 having a node depth 510 of 4. FIG. 5 and FIG. 6 illustrate only one example of the changes to the tree data structure that may occur after a data block of data received by the primary backup appliance 114. The tree data structure is dynamic and numerous modifications to the tree data structure will occur as data blocks are received by the primary backup appliance 114. Throughout the operation of the present invention the tree data structure is maintained to reflect any necessary changes. The example illustrated in FIG. 5 and FIG. 6 does not limit the present invention to this example. The tree data structure is used by primary backup appliance 114 to locate a block of data. The data tree is searched starting at the top of the tree (depth=0) for a particular LUN. A lower depth for a LUN results in a reduction in the amount of time to search for the LUN.

At step 405, the tree data structure was searched to attempt to locate the corresponding WWN/LUN node of the received block of data. Because the tree data structure is based on definite rules that depend upon the numerical order of the WWN/LUN nodes, the expected location of the WWN/LUN node of the received block of data can be determined quickly. Those of ordinary skill in the art will be able to accomplish this and no more explanation will be given regarding searching tree data structures. After determining the expected location of the WWN/LUN node for the received block of data at step 405, the primary backup appliance 114 then determines at step 406 if the WWN/LUN node for the received block of data exists for the tree data structure for the consistent transaction data set. If the WWN/LUN node for the received block of data does not exist for the tree data structure for the consistent transaction data set of the received block of data then step 407 is executed. If the WWN/LUN node for the received block of data does exist for the tree data structure then step 409 is executed. At step 407, a new tree node is allocated to store the data for the WWN/LUN combination of the received block and then step 409 is executed. The tree data structure is updated with the new WWN/LUN node. At step 409, the location of the data block within the WWN/LUN structure is determined. If the data block already exists within the WWN/LUN structure, the old data is overwritten with the received data at step 408. If the data block does not already exists within the WWN/LUN structure, a location for the new data is allocated, the block of data is stored at the allocated location and the WWN/LUN structure is updated for future reference for this location at step 410.

At step 411 the depth of the received block's WWN/LUN node in the tree data structure is compared to the depth threshold, K. The depth threshold, K can be calculated using a variety of methods, and should be tailored for the communication interface(s) the backup appliance uses to receive data. For example, in an ESCON environment, a connection is established on a hardware port on a host bus adapter, and no other transactions can be received on that port until the current transaction is completed. For this situation, the depth threshold, $K=\log_2(P)$ where P is the number of physical ESCON ports on the backup appliance. Because a maximum of P transactions can be received simultaneously, having the information about this many LUNs near the top of the tree data structure should be sufficient. In another environment, (FC-SCSI for example), a number of transactions can be received simultaneously on each hardware port. For this reason, more complicated methods should be used to determine the depth threshold, K. A running average of the number of sources that send transactions to the backup appliance may be used in this situation. Assuming one LUN will be used by a given source at a given time, $K=\log_2(P)$ where P is the number of active sources or the running average of the number of sources would be an appropriate depth threshold calculation. In mixed environments, the needs of each communication interface should be combined to determine the threshold value. Alternatively the number of active input ports, P, may be determined by primary backup appliance 114 polling storage management device interface 130, (FIG. 3) to determine the number of active communication line(s) 203. Each of active communication line(s) 203 receives data from storage management device(s) 208 through active ports in storage management device interface 130. FIG. 3 shows communication line(s) 203 labeled 1 to N. The number of active communication line(s) 203 could range from 0 to N and may dynamically change during the operation of primary backup appliance 114. The number of active input ports, P, is equal to the number of active communication line(s) 203 in use for the consistent transaction set of the received block of data and may range from 0 to N. For one embodiment, the depth threshold (K) is calculated as $K=\log_2(P)$. For example, for 8 active input ports, (P=8) then depth threshold, K, would be equal to 3. Other methods to calculate depth threshold, K, may be used to further optimize the operation of the present invention.

If at step 411, the depth of the WWN/LUN node in the tree data structure is greater than the depth threshold, K, then step 412 is executed. If at step 411, the depth of the WWW/LUN node in the tree data structure is less than or equal to the depth threshold, K, then it is not necessary to alter the position of the WWW/LUN node because the WWW/LUN node is already at a quickly accessible location in the tree data structure. At step 412 the WWN/LUN node for the received block of data is moved to the top of the tree data structure using normal splay tree operations resulting in a depth of 0 for the LUN. The depth of 0 in the tree data structure for the LUN/LBA combination will result in the LUN being the first node encountered during a search operation on the tree data structure. The tree data structure is organized such that the larger the depth of LUN node is the longer it will take to retrieve the LUN node during a search operation. Those LUN nodes near the top of the tree are the most frequently used LUN nodes and therefore are most likely to be used for data transactions. This invention establishes a depth threshold, K, that must be exceeded before the LUN node is moved to the top of the tree data structure. This threshold value prevents the nodes in the tree data structure from constantly being moved around. In a normal splay tree, any accessed node is moved to the top of the tree data structure. Many WWW/LUN nodes will be active during the operation of the present invention. The number of active WWW/LUN nodes is approximately equal to the number of input ports. To provide quick access to the active nodes and to avoid thrashing nodes around in the tree excessively, the depth threshold is used to limit the frequency that nodes will be relocated within the tree data structure.

At step 413, the process is examined to determine if the consistent transaction set creation interval is complete. The end of the consistent transaction set creation interval occurs when the last block of data has been received and for the group of data for the creation interval. At step 413, the block of data is examined to determine if it is the last of the group of data. Information associated with the block of data is used to indicate whether it is the last block of data. This information may be transmitted with the block of data or separately transmitted from the data source. If the consistent transaction set creation interval is not complete then step 403 is executed again to receive the next block of data. If the consistent transaction set creation is complete, then step 413 transfers control to step 414. At step 414 the complete consistent transaction data set is sent to the secondary site 150 using communication line(s) 115 and control returns to step 402 to receive a new consistent transaction set. When the consistent transaction set creation interval ends, the tree data structure contains all the data for the set, and redundant overwritten data blocks are eliminated. The complete tree data structure transferred to the secondary site 150 updates the secondary storage to create a point in time version of the consistent transaction set created during the creation interval. This point in time version may then be used to continue processing in the event of a failure at the primary site 110.

Throughout the operation of the present invention the data tree structure is maintained for each group of data received. The end of the creation interval occurs when the last block of data is received for the current group of data. The complete group of data and the associated tree data structure may then transferred to one or more secondary storage locations. The tree data structure contains the addressing information used to store the data on various storage devices. The creation interval may vary with operation conditions and may be optimized to increase the efficiency of creating and storing consistent transaction sets at one or more storage site.

While the preferred embodiments of the present invention have been illustrated in detail, the skilled artisan will appreciate that modifications and adaptations to those embodiments may be made without departing from the scope of the present invention as set forth in the following claims.

What is claimed is:

1. A method for organizing and storing data comprising the steps of:
   receiving a block of data from a data source at a first data storage site;
   maintaining addressing information in a tree data structure for said block of data;

determining a storage device address to store said block of data;

determining a logical block address within said storage device address to store said block of data;

determining said tree data structure for said block of data;

determining a depth in said tree data structure of said storage device address;

in response to said storage device address not existing in said tree data structure, creating said storage device address in said tree data structure;

in response to said logical block address existing in said tree data structure, overwriting an existing block of data with said block of data at said logical address;

in response to said logical block address not existing in said tree data structure, storing said block of data at said logical block address;

in response to said depth in said tree data structure of said storage device address being greater than a depth threshold, K, adjusting said depth in said tree data structure of said storage device address to be less than said depth threshold, K;

in response to said block of data not being a final block of data of a group of data, returning to the step of receiving a block of data; and transferring said group of data to a second data storage site.

2. The method of claim 1, comprising the additional steps of:

determining a number of active input ports receiving data from said data source; and setting said depth threshold, K to depend upon said number of active input ports.

3. The method of claim 1, comprising the additional steps of:

determining a number of active input ports receiving data from said data source; and setting said depth threshold, K equal to $\log_2(P)$, where P = said number of active input ports.

4. The method of claim 1, wherein the step of adjusting said depth in said tree data structure further comprises the step of:

adjusting said depth in said tree data structure of said storage device address to be equal to zero.

5. An article of manufacture comprising a data storage medium tangibly embodying a program of machine-readable instructions executable by a digital processing apparatus to perform method steps for organizing and storing data comprising the steps of:

receiving a block of data from a data source at a first data storage site;

maintaining addressing information in a tree data structure for said block of data;

determining a storage device address to store said block of data;

determining a logical block address within said storage device address to store said block of data;

determining said tree data structure for said block of data;

determining a depth in said tree data structure of said storage device address;

in response to said storage device address not existing in said tree data structure, creating said storage device address in said tree data structure;

in response to said logical block address existing in said tree data structure, overwriting an existing block of data with said block of data at said logical address;

in response to said logical block address not existing in said tree data structure, storing said block of data at said logical block address;

in response to said depth in said tree data structure of said storage device address being greater than a depth threshold, K, adjusting said depth in said tree data structure of said storage device address to be less than said depth threshold, K;

in response to said block of data not being a final block of data of a group of data, returning to the step of receiving a block of data; and transferring said group of data to a second data storage site.

6. The article of manufacture of claim 5, comprising the additional steps of:

determining a number of active input ports receiving data from said data source; and setting said depth threshold, K to depend upon said number of active input ports.

7. The article of manufacture of claim 5, comprising the additional steps of:

determining a number of active input ports receiving data from said data source; and setting said depth threshold, K equal to $\log_2(P)$, where P = said number of active input ports.

8. The article of manufacture of claim 5, wherein the step of adjusting said depth in said tree data structure further comprises the step of:

adjusting said depth in said tree data structure of said storage device address to be equal to zero.

9. A data storage system comprising:

a primary backup appliance located at a first data storage site;

a second data storage site;

one or more communication lines for communication between said first data storage site and said second data storage site;

wherein said primary backup appliance is programmed to perform method steps for organizing and storing data, comprising the steps of:

receiving a block of data from a data source at a first data storage site;

maintaining addressing information in a tree data structure for said block of data;

determining a storage device address to store said block of data;

determining a logical block address within said storage device address to store said block of data;

determining said tree data structure for said block of data;

determining a depth in said tree data structure of said storage device address;

in response to said storage device address not existing in said tree data structure, creating said storage device address in said tree data structure;

in response to said logical block address existing in said tree data structure, overwriting an existing block of data with said block of data at said logical address;

in response to said logical block address not existing in said tree data structure, storing said block of data at said logical block address;

in response to said depth in said tree data structure of said storage device address being greater than a depth threshold, K, adjusting said depth in said tree data structure of said storage device address to be less than said depth threshold, K;

in response to said block of data not being a final block of data of a group of data, returning to the step of receiving a block of data; and transferring said group of data to a second data storage site.

10. The system of claim 9, comprising the additional steps of:

determining a number of active input ports receiving data from said data source; and setting said depth threshold, K to depend upon said number of active input ports.

11. The system of claim 9, comprising the additional steps of:

determining a number of active input ports receiving data from said data source; and setting said depth threshold, K equal to $\log_2(P)$, where P =said number of active input ports.

12. The system of claim 9, wherein the step of adjusting said depth in said tree data structure further comprises the step of:

adjusting said depth in said tree data structure of said storage device address to be equal to zero.

13. A method for organizing and storing data comprising the steps of:

receiving a block of data from a data source at a first data storage site;

maintaining addressing information in a tree data structure for said block of data;

determining a storage device address to store said block of data;

determining a logical block address within said storage device address to store said block of data;

in response to said logical block address existing in said tree data structure, overwriting an existing block of data with said block of data at said logical address;

in response to said block of data not being a final block of data of a group of data, returning to the step of receiving a block of data; and transferring the final block for each specific address of said group of data to a second data storage site, in accordance with said tree data structure to allow storing said blocks to actual addresses at said second data storage site.

14. The method of claim 13, wherein said group of data is a consistent transaction set.

15. An article of manufacture comprising a data storage medium tangibly embodying a program of machine-readable instructions executable by a digital processing apparatus to perform method steps for organizing and storing data comprising the steps of:

receiving a block of data from a data source at a first data storage site;

maintaining addressing information in a tree data structure for said block of data;

determining a storage device address to store said block of data;

determining a logical block address within said storage device address to store said block of data;

in response to said logical block address existing in said tree data structure, overwriting an existing block of data with said block of data at said logical address;

in response to said block of data not being a final block of data of a group of data, returning to the step of receiving a block of data; and transferring the final block for each specific address of said group of data to a second data storage site, in accordance with said tree data structure to allow storing said blocks to actual addresses at said second data storage site.

16. The article of manufacture of claim 15, wherein said group of data is a consistent transaction set.

17. A data storage system comprising:

a primary backup appliance located at a first data storage site;

a second data storage site;

one or more communication lines for communication between said first data storage site and said second data storage site;

wherein said primary backup appliance is programmed to perform method steps for organizing and storing data, comprising the steps of:

receiving a block of data from a data source at a first data storage site;

maintaining addressing information in a tree data structure for said block of data;

determining a storage device address to store said block of data;

determining a logical block address within said storage device address to store said block of data;

in response to said logical block address existing in said tree data structure, overwriting an existing block of data with said block of data at said logical address;

in response to said block of data not being a final block of data of a group of data, returning to the step of receiving a block of data; and transferring the final block for each specific address of said group of data to a second data storage site, in accordance with said tree data structure to allow storing said blocks to actual addresses at said second data storage site.

18. The system of claim 16, wherein said group of data is a consistent transaction set.

* * * * *